United States Patent
Dyer et al.

(10) Patent No.: US 11,448,081 B2
(45) Date of Patent: Sep. 20, 2022

(54) BALANCED CIRCUMFERENTIAL SEAL

(71) Applicant: United Technologies Corporation, Farmington, CT (US)

(72) Inventors: Timothy R. Dyer, Lake Worth Beach, FL (US); Abhijeet Shrestha, Newington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 153 days.

(21) Appl. No.: 16/657,739

(22) Filed: Oct. 18, 2019

(65) Prior Publication Data
US 2021/0115805 A1   Apr. 22, 2021

(51) Int. Cl.
  *F01D 11/00* (2006.01)
  *F01D 5/02* (2006.01)
  *F02C 7/28* (2006.01)
(52) U.S. Cl.
  CPC ............ *F01D 11/003* (2013.01); *F01D 5/027* (2013.01); *F02C 7/28* (2013.01); *F05D 2230/60* (2013.01); *F05D 2240/55* (2013.01); *F05D 2260/15* (2013.01); *F05D 2260/30* (2013.01); *F05D 2300/226* (2013.01); *F05D 2300/611* (2013.01)
(58) Field of Classification Search
  CPC ........ F01D 5/027; F01D 11/003; F01D 11/02; F01D 11/025; F02C 7/28; F04D 29/044; F04D 29/102; F04D 29/12; F04D 29/122; F05D 2240/55
  See application file for complete search history.

(56) References Cited

U.S. PATENT DOCUMENTS

| 4,084,919 | A | * | 4/1978 | Morris, Jr. | ............ F01D 11/001 277/421 |
| 5,593,165 | A |   | 1/1997 | Murray et al. | |
| 5,767,403 | A |   | 6/1998 | Kopp et al. | |
| 6,893,222 | B2 |  | 5/2005 | Allam | |
| 7,175,388 | B2 |  | 2/2007 | Labbé et al. | |
| 7,371,042 | B2 | * | 5/2008 | Lee | ........ F01D 25/243 415/119 |

(Continued)

FOREIGN PATENT DOCUMENTS

| BE | 405133 A |   | 10/1934 | |
| GB | 444814 A | * | 3/1936 | ........... F16J 15/4472 |
| GB | 445036 A | * | 4/1936 | ............. F16J 15/445 |

OTHER PUBLICATIONS

European Search Report dated Jan. 25, 2021 for European Patent Application No. 20191120.3.

(Continued)

*Primary Examiner* — Christopher R Legendre
(74) *Attorney, Agent, or Firm* — Bachman & LaPointe, P.C.

(57) ABSTRACT

A machine has: an outer member; an inner member mounted for rotation about an axis relative to the outer member; and a seal system. The seal system has: a seal housing mounted to the outer member; one or more seal rings held by the seal housing and having an inner diameter surface; and a seal runner mounted to the inner member and having a first outer diameter surface portion contacting or facing the inner diameter surface of the one or more seal rings. The seal runner has a circumferential array of mounting features. One or more weights are mounted to one or more of the mounting features.

20 Claims, 5 Drawing Sheets

(56) References Cited

U.S. PATENT DOCUMENTS

| | | | |
|---|---|---|---|
| 7,435,052 B2* | 10/2008 | Spencer | F01D 11/02 415/229 |
| 8,182,153 B2* | 5/2012 | Singh | F16C 27/066 384/99 |
| 8,631,578 B2 | 1/2014 | Glasspoole et al. | |
| 8,678,741 B2 | 3/2014 | Olennikov | |
| 8,888,458 B2 | 11/2014 | Billings et al. | |
| 9,631,508 B2 | 4/2017 | Blais et al. | |
| 2005/0244272 A1 | 11/2005 | Bruno et al. | |
| 2005/0265846 A1 | 12/2005 | Przytulski et al. | |
| 2007/0059164 A1 | 3/2007 | Brault et al. | |
| 2008/0008589 A1 | 1/2008 | Lee | |
| 2008/0095613 A1 | 4/2008 | Blanchard et al. | |
| 2009/0025461 A1 | 1/2009 | Walters et al. | |
| 2016/0146103 A1* | 5/2016 | Muldoon | F01D 5/026 415/213.1 |
| 2016/0348792 A1* | 12/2016 | Labbe | F01D 25/183 |
| 2018/0051701 A1* | 2/2018 | Kupiszewski | H02K 7/1823 |
| 2021/0115805 A1* | 4/2021 | Dyer | F16J 15/441 |

OTHER PUBLICATIONS

European Office Action dated Jul. 5, 2022 for European Patent Application No. 20191120.3.

\* cited by examiner

BALANCED CIRCUMFERENTIAL SEAL

U.S. GOVERNMENT RIGHTS

This invention was made with Government support under N68335-13-C-0005 awarded by the United States Navy. The Government has certain rights in this invention.

BACKGROUND

The disclosure relates to gas turbine engines. More particularly, the disclosure relates to circumferential seals.

Circumferential seals are used in machines such as gas turbine engines. A typical engine example is to seal oil and air inside of bearing compartments. Typical seals are segmented carbon seals. Segment ends may interfit to reduce leakage between segments. Or there may be two stages of seal with segment boundaries circumferentially offset. Alternative seal materials being developed include ceramics, plastics and metals.

Seal runners provide the rotating sealing surface (face) the carbon sealing elements sit and seal on. A typical situation has the sealing surface as an outer diameter (OD) surface. Such a sealing surface must remain generally cylindrical (limited "coning" and runout) during all operating conditions in order to provide a good seal and prevent oil leakage. Seal runners are typically a simple metal ring with a shoulder. The seal runner may include a metallic substrate with a hard and coating at the sealing surface. Also, seal material may include a lubricious addition. For example, the seal ring(s) may be at least locally impregnated with a salt or other material to reduce friction.

U.S. Pat. No. 7,175,388, Labbe et al., Feb. 13, 2007, "Integrated labyrinth and carbon seal", discloses a single-stage carbon seal with shaft-integral seal runner.

U.S. Pat. No. 9,631,508, Blais et al., Apr. 25, 2017, "Internally cooled seal runner", discloses a two-stage carbon seal.

U.S. Pat. No. 5,593,165, Murray et al., Jan. 14, 1997, "Circumferential flow channel for carbon seal runner cooling", discloses a single-stage carbon seal with labyrinth backup.

U.S. Pat. No. 8,678,741, Olennikov, Mar. 25, 2014, "Oil cooled runner", discloses another single-stage carbon seal.

Separately from sealing, such machines may be subject to trim balance procedures. After the rig or engine is at least partially assembled, trim balance weights can be added to balance the rotating components of the engine and reduce operating vibrations. A typical engine will have its rotor formed with one or more integral circumferential arrays of weight mounting features. Exemplary trim balancing is done by running the engine (or otherwise driving rotation of a rotor) and plotting the amplitude and phase angle of the engine response. Then, a trial balance weight is added to the engine rotor at an arbitrary angular location (e.g., a random one of the features). Again, the rotation is driven and the amplitude and phase angle of the engine response with trial weight is plotted. Using this trial weight response, the final location (particular mounting location) and magnitude (weight mass) is determined. The trial weight is removed and the final weight (if within max. weight spec.) is then added to this calculated location. If calculated weight exceeds a maximum (associated with limiting local flange deformation), a calculated pair or more of weights may be placed at two or more locations centered on the original calculated location.

Trim balance weights are usually placed on compressor/turbine rotors away from the centerline of the engine to provide the maximum level of imbalance correction. This maximizes the effect of a given weight size and allows finer gradations of circumferential position.

A number of different balance weight mounting feature constructions are known. Axially protruding flanges are shown in U.S. Pat. No. 6,893,222 (the '222 patent), Allam, May 17, 2005, "Turbine balancing", and U.S. Pat. No. 8,631,578 (the '578 patent), Glasspoole et al., Jan. 21, 2014, "Radial balancing clip weight for rotor assembly". A radially inwardly projecting flange is shown in U.S. Pat. No. 8,888,458 (the '458 patent), Billings et al., Nov. 18, 2014, "Turbomachine rotor balancing system". The '222 patent and the '458 patent illustrate fastening rivets. The '578 patent shows clip-type weights without additional fastener(s).

SUMMARY

One aspect of the disclosure involves a machine comprising: an outer member; an inner member mounted for rotation about an axis relative to the outer member; and a seal system. The seal system comprises: a seal housing mounted to the outer member; one or more seal rings held by the seal housing and having an inner diameter surface; and a seal runner mounted to the inner member and having a first outer diameter surface portion contacting or facing the inner diameter surface of the one or more seal rings. The seal runner has a circumferential array of mounting features. One or more weights are mounted to one or more of the mounting features.

A further embodiment of any of the foregoing embodiments may additionally and/or alternatively include the seal runner having: a mounting section mounted to the inner member; a sealing section including the first outer diameter surface portion radially outwardly spaced from the mounting section; a first hub between the mounting section and the sealing section; a balancing section including the mounting features; and a second hub between the mounting section and the balancing section.

A further embodiment of any of the foregoing embodiments may additionally and/or alternatively include the sealing section axially overlapping the mounting section.

A further embodiment of any of the foregoing embodiments may additionally and/or alternatively include the first hub and the second hub being angled off-radial in the same direction.

A further embodiment of any of the foregoing embodiments may additionally and/or alternatively include the mounting section, the sealing section, the first hub, the balancing section, and the second hub being formed on a single metallic piece.

A further embodiment of any of the foregoing embodiments may additionally and/or alternatively include the single metallic piece being a Ti alloy.

A further embodiment of any of the foregoing embodiments may additionally and/or alternatively include the sealing section including a chromium carbide coating A further embodiment of any of the foregoing embodiments may additionally and/or alternatively include the mounting section having an inner diameter spline engaging a spline of the inner member.

A further embodiment of any of the foregoing embodiments may additionally and/or alternatively include the spline of the inner member being a castellated rim.

A further embodiment of any of the foregoing embodiments may additionally and/or alternatively include the mounting section having an interference fit with the inner member.

A further embodiment of any of the foregoing embodiments may additionally and/or alternatively include the mounting features each comprising one or more mounting holes. Each of the one or more weights is mounted via one or more fasteners extending through the one or more mounting holes.

A further embodiment of any of the foregoing embodiments may additionally and/or alternatively include the one or more seal rings being carbon seal rings.

A further embodiment of any of the foregoing embodiments may additionally and/or alternatively include the one or more seal rings being two seal rings.

A further embodiment of any of the foregoing embodiments may additionally and/or alternatively include the mounting features provide 12 to 60 discrete circumferential mounting locations.

A further embodiment of any of the foregoing embodiments may additionally and/or alternatively include the machine being a turbine engine wherein the inner member is a shaft and the outer member is static structure.

A further embodiment of any of the foregoing embodiments may additionally and/or alternatively include a method for manufacturing the machine. The method comprises: mounting the seal runner to the inner member; and after the mounting of the seal runner, mounting said one or more weights to said one or more of the mounting features.

A further embodiment of any of the foregoing embodiments may additionally and/or alternatively include the mounting of the seal runner comprising interference fitting.

A further embodiment of any of the foregoing embodiments may additionally and/or alternatively include the mounting of the weights comprising inserting at least one fastener through each of the weights.

A further embodiment of any of the foregoing embodiments may additionally and/or alternatively include a method for manufacturing or using the machine. The method comprises: rotating the inner member about the axis; measuring vibrational parameters of the rotating inner member; and mounting said one or more balance weights to improve the balance of the inner member.

A further embodiment of any of the foregoing embodiments may additionally and/or alternatively include the mounting of the weights comprising inserting at least one fastener through each of the weights.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
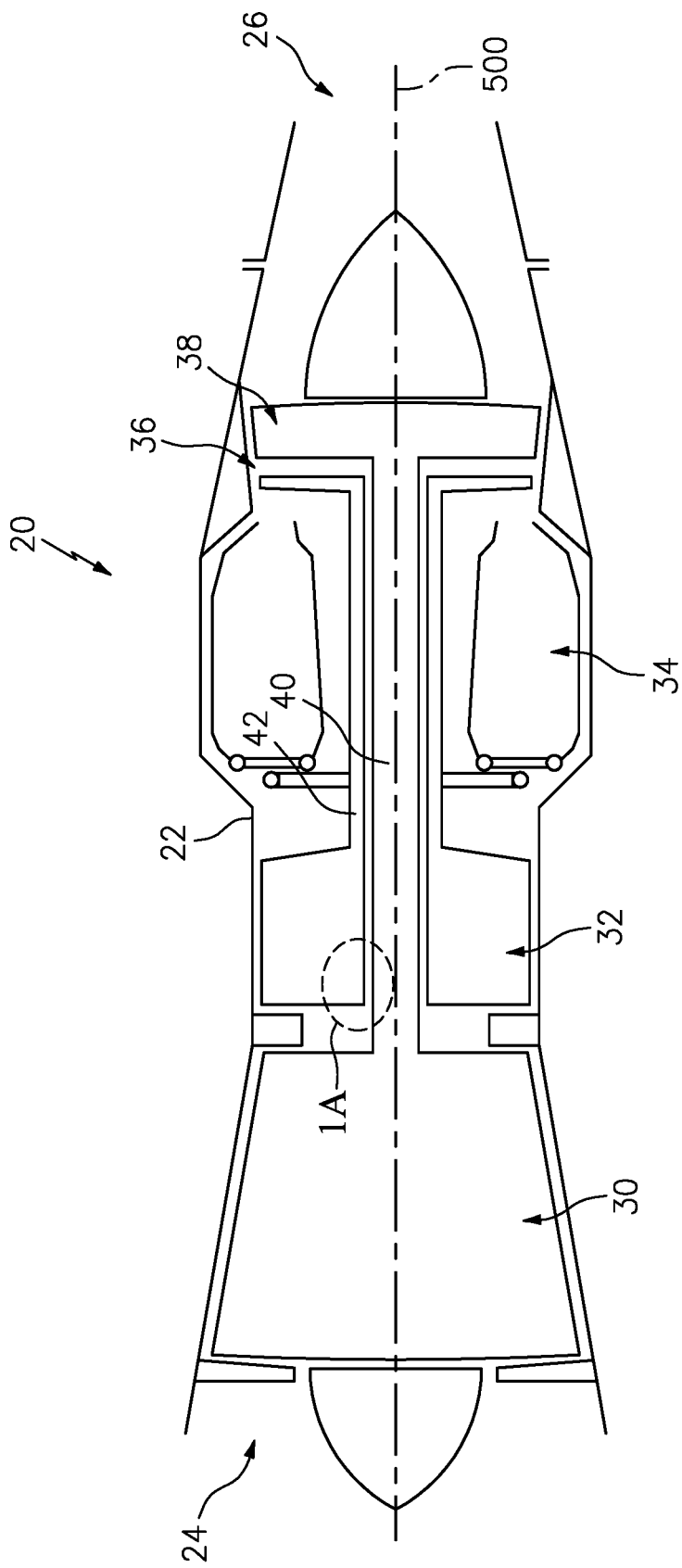
FIG. 1 is a schematic sectional view of an exemplary gas turbine engine.
Figure 1A:
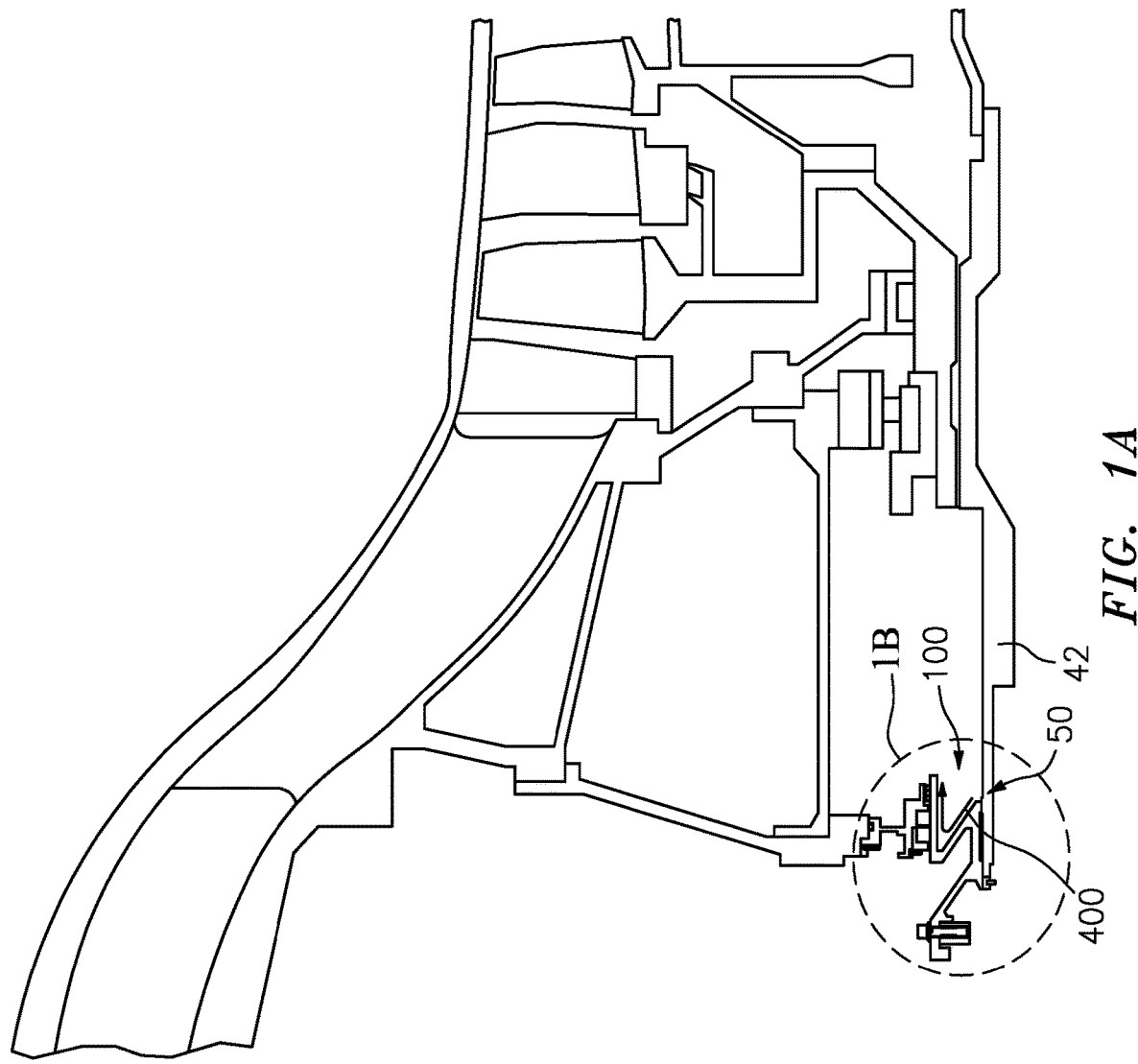
FIG. 1A is an enlarged view of a forward end of a high pressure spool of the engine of FIG. 1.

FIG. 1 generically shows an example of a gas turbine engine 20 having a centerline or central longitudinal axis 500. The example is a turbojet, namely a two-spool turbojet. However, the teachings below may apply to other configurations including turboprops, turbofans, turboshafts, industrial gas turbines, and the like and to other spool arrangements. The engine generally has a case structure (case) 22 extending from an upstream inlet 24 to a downstream outlet 26. From upstream to downstream, the engine has a plurality of sections: low pressure compressor (LPC) 30, high pressure compressor (HPC) 32, combustor 34 (e.g., annular shown or alternatively can-type), high pressure turbine (HPT) 36, and low pressure turbine (LPT) 38. Each of the LPC, HPC, HPT, and LPT comprises one or more stages of blades on the associated low spool or high spool and one or more stages of vanes interspersed with the blade stages. The low spool has a low shaft 40 linking the LPT to the LPC and the high spool comprises a high shaft 42 linking the HPT to the HPC FIG. 1A shows a seal system 100 in the engine 20 sealing between an outer member and an inner member mounted for rotation about an axis relative to the outer member. In exemplary engine 20, the axis is the centerline 500. The exemplary inner member is a shaft (e.g., the high shaft 42) and the outer member is fixed/static/grounded structure such as the case 22. The particular exemplary situation places the seal system 100 near the forward end 50 of the high shaft 42. The exemplary seal system 100 is positioned to isolate a first space 102 (FIG. 1B) from a second space 104. The exemplary first space 102 is an air cavity between the LPC 30 and HPC 32 whereas the exemplary second space 104 is an oil-wetted bearing compartment. The seal system 100 includes a seal housing 110 mounted to the outer member. In the illustrated example, an outer section 112 of the seal housing 110 is mounted in sealed press fit relation with the outer member 118 (e.g., inter-section frame 118). Exemplary mounting rotationally keys the seal housing via a radial tab 113 of the outer portion 112 in an axial slot 119 in the inner diameter surface of the receiving compartment of the static member 118. Exemplary axial securing/fastening is via a lock ring 114 in a circumferential inner diameter (ID) groove in the surrounding static member 118.

The seal housing 110 carries one or more seal rings (e.g., a forward ring 120 and an aft ring 122). Exemplary rings 120, 122 are segmented carbon rings (although other known or yet-developed materials may be used as noted above) with intra-segment boundaries (not shown) of the two rings circumferentially offset. The exemplary seal housing 110 has an inner section 130 carrying the seal rings and radially inwardly spaced from the outer section 112 by a web 132. The exemplary inner section 130 itself includes a labyrinth 134 for further sealing.

The seal rings 120, 122 may be retained by conventional means such as a lock ring 136 in an inner diameter (ID) groove in the inner section 130. The seal rings each have an inner diameter (ID) surface 140 in contacting or facing relationship to an outer diameter surface portion 150 of a sealing section 151 of a seal runner 152 mounted to the inner member.

As so far described, the seal system 100 may be representative of any of numerous existing configurations. However, the seal system 100 integrates a balanced system 160. The balance system comprises a circumferential array of mounting features 162 on the seal runner 152. For balancing, one or more weights 164 are mounted to one or more of the mounting features 162. Exemplary mounting features comprise mounting holes 166. An exemplary mounting system involves one hole 166 per mounting feature (and thus circumferential weight mounting location) with the holes 166 evenly circumferentially spaced. An exemplary number of holes is twelve to sixty (or narrowly twelve to thirty-six with an exemplary eighteen). Although these exemplary numbers provide a relatively even intervals measured in degrees (e.g., sixty holes representing a six degree interval) other values are possible. Typically, only a small number (if any) of the features will bear weights (e.g., one to three total weights).

The exemplary holes 166 are formed extending radially through a balancing section 153 of the seal runner 152. The exemplary balancing section 153 is axially spaced from the sealing section 151. In the exemplary implementation, it is spaced forward of the sealing section 151. The exemplary seal runner 152 also includes a mounting section 154. The mounting section 154 extends from a forward end (rim) 170 to an aft end 172 and has an inner diameter (ID) surface 174 and an outer diameter (OD) surface 176. A first hub 186 extends between the mounting section 154 and the sealing section 151 and a second hub 188 extends between the mounting section 154 and the balancing section 153. The exemplary first hub 186 is an aft hub extending from near the aft end 172 of the mounting section 154 radially outwardly and forwardly to merge with a forward end 178 portion of the sealing section 151 so as to leave the remainder of the sealing section axially cantilevered aftward to a free distal aft end 180. This allows a flow 400 of cooling fluid (e.g., oil) to flow from axially forward of seal ring 120 to axially aft of sealing ring 122 to dissipate heat in sealing section 151. Similarly, the second hub 188 also extends radially outwardly and forwardly to merge with an aft end 182 of the balancing section 153.

The balancing section 153 extends to a free distal forward end 184. At this forward end 184, the balancing section has a radially inwardly extending flange 190 extending to an inner diameter (ID) rim 192. The flange 190 provides structural reinforcement as discussed below. At the junction of the forward hub 188 and balancing section 153, a second flange 194 extends radially inward to a rim 196 and has a forward face 198. As is discussed further below, this second flange 194 also provides structural reinforcement but also provides a portion of the mounting features. The balancing section 153 has an inner diameter (ID) surface 220 (FIG. 1C) and an outer diameter (OD) surface 222 with the holes 166 extending radially therebetween. The exemplary weights 164 are positioned radially inboard of the ID surface 220, each having an outer diameter (OD) surface or end 230 abutting the ID surface 220. The weights further have an inner diameter (ID) surface or end 232. The exemplary weights have a square footprint or planform characterized by a forward face or end 234, an aft face or end 236, and first and second circumferential end faces 238 and 240 (FIG. 2).

The aft face 236 (FIG. 1C) abuts the forward face 198 of the second flange 194 to register the weight 164. For fastening via a fastener 250, the weight 164 has a radial bore (e.g., a through-bore) 242. The exemplary through-bore is threaded such as via a self-locking thread insert 244 (to prevent fastener 250 (a threaded fastener such as a screw or bolt) from backing out during operation) in a metallic body of the weight. The exemplary weights are steel or nickel alloys. The exemplary fastener 250 is a bolt (e.g., flanged twelve-point bolt shown or hex- or socket-head bolt) whose head underside abuts the OD surface 222 and whose threaded shank extends through the hole 166 into the threaded bore 242 of the weight to secure the weight OD end 230 against the ID surface 220. Alternative fasteners (not shown) used with unthreaded bores may be rivets. Alternative weights may include separate or integral clips for mounting and may reflect any appropriate existing balance weight mounting technology. For example, it may be particularly appropriate to use similar weights or mounting technologies on the seal runner as are used elsewhere in the engine or as may be used in other engines of the given manufacturer.

Figure 2:
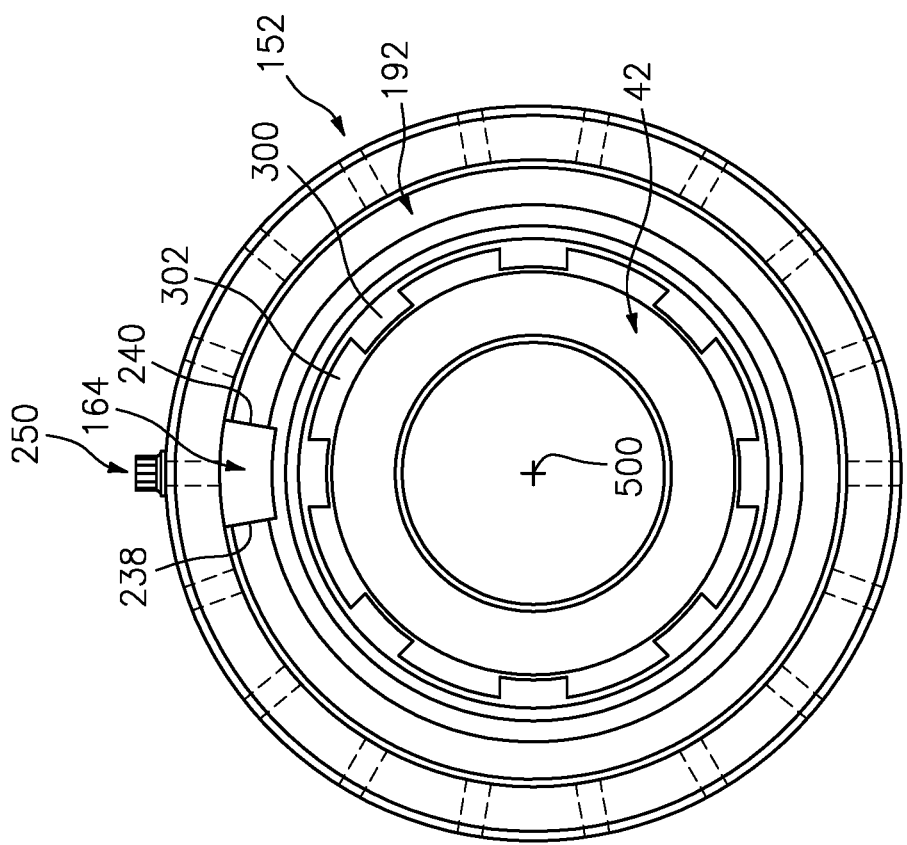
FIG. 2 is an isolated rearward view of a seal runner mounted to a shaft in the engine of FIG. 1 and bearing a single weight.

FIG. 2 also shows aspects of anti-rotation coupling of the seal runner 152 to the shaft 42. The exemplary anti-rotation coupling involves splines 300 of the mounting section 154 circumferentially interdigitated with castellations 302 of the forward rim 52 of the shaft 42. To define the castellations 302, slots between the castellations fully separate the castellations. Alternative implementations may leave some inner diameter (ID) material intact so that the castellations become more conventional outer diameter (OD) splines.

The exemplary splines 300 are adjacent the forward end 170 (FIG. 1B) of the mounting section 154. For stability, adjacent the aft end 172, there may be an interference fit at an aft contact location 318 between the ID surface 174 along an inner diameter (ID) protrusion 320 and the shaft 42 OD surface along a corresponding outer diameter (ID) protrusion 322. Similarly, there may be an interference at a forward contact location 330 aft of the splining leaving a gap 340 intermediate the contact locations 318 and 330.

Manufacture/techniques may be those corresponding to existing seal manufacture techniques and balance weight manufacture techniques. The seal housing 110 and seal runner 152 (or substrate 296 (FIG. 1D) thereof) may be machined of an alloy (e.g., a titanium alloy such as Ti6Al4V). The machining may include a general turning operation to define the overall profile combined with drilling of the holes 166 and milling (e.g., end milling) of slots to separate the splines 300. Conventional protective coatings (not shown) may be provided. Additionally, a wear-resistant hard coating 298 (FIG. 1D—e.g., chromium carbide) may be applied to the metallic substrate 296 of the seal runner to form the surface 150 (e.g., via spraying such as thermal spraying).

Figure 1B:
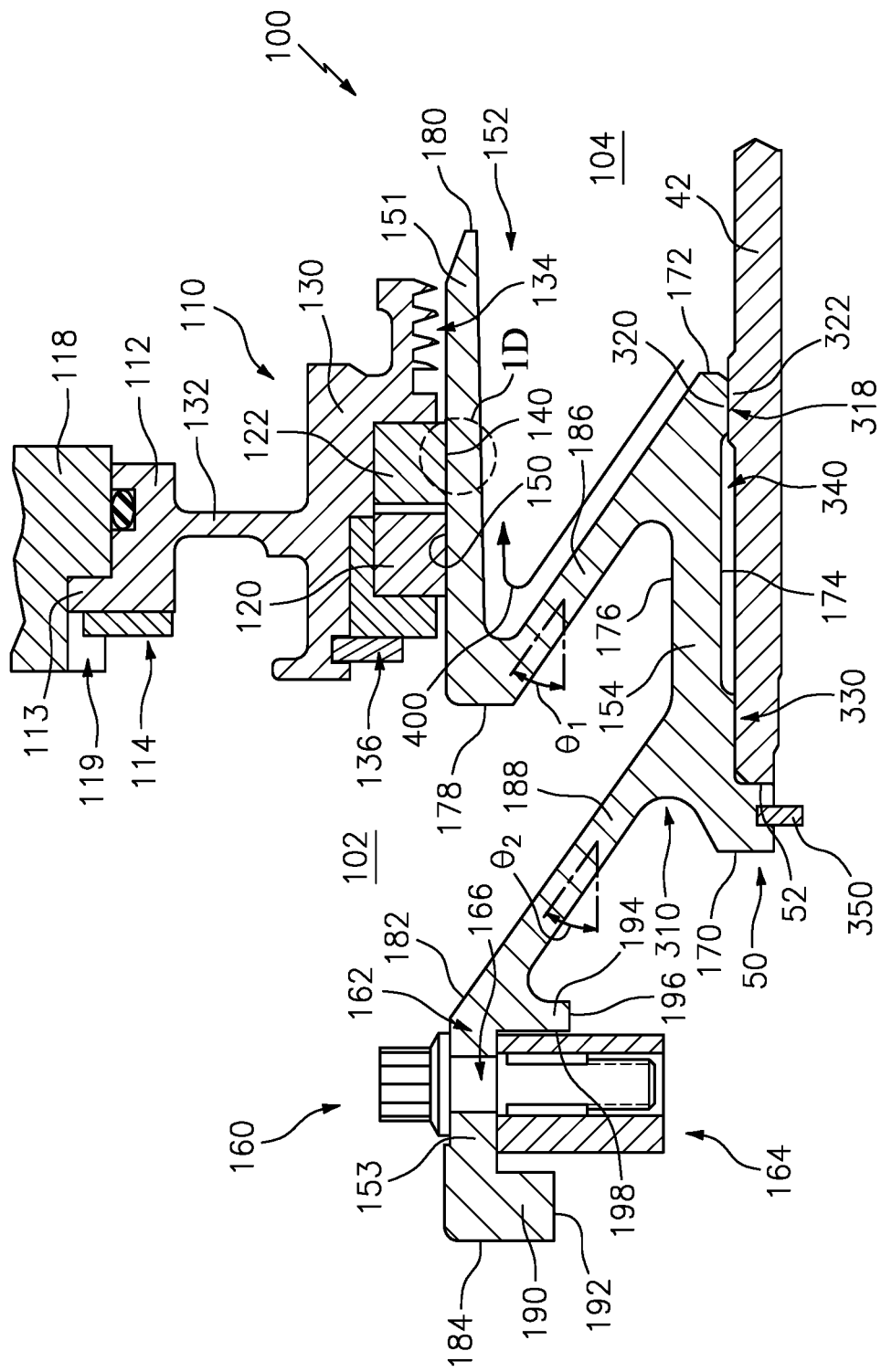
FIG. 1B is a further enlarged view of a seal system in the engine of FIG. 1.
Figure 1D:
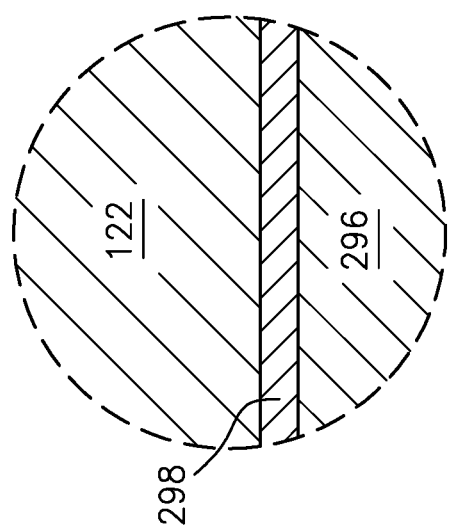
FIG. 1D is an enlarged view of a sealing interface in the sealing system of FIG. 1B.
Figure 1C:
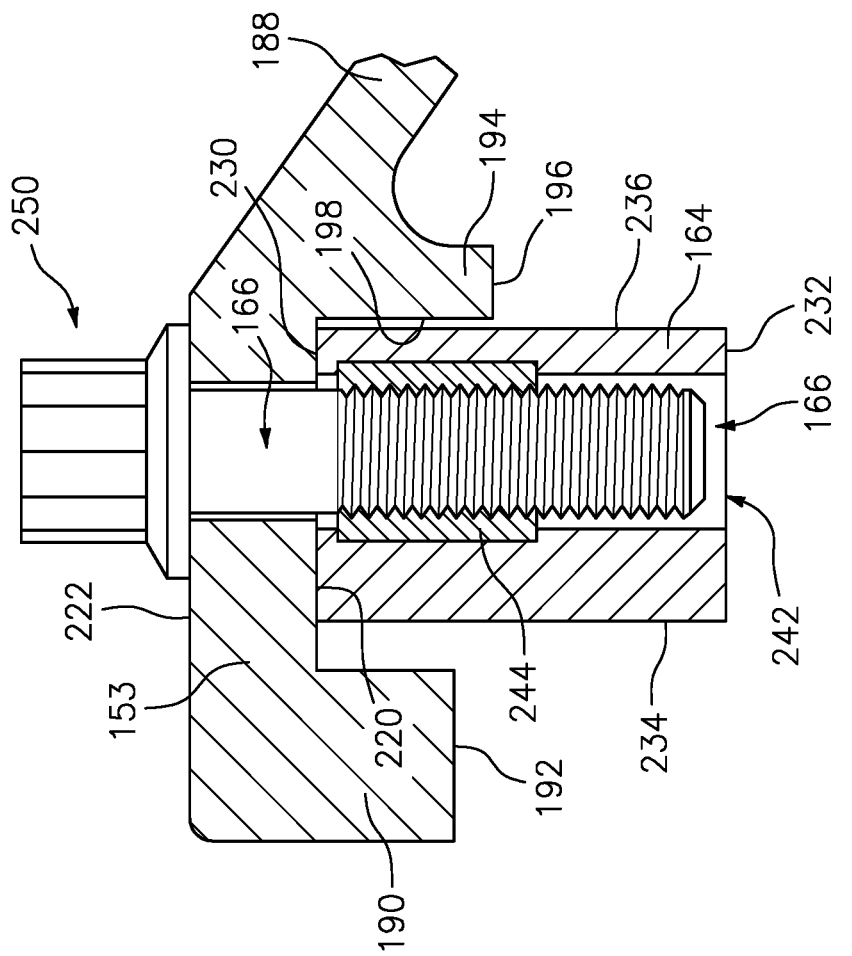
FIG. 1C is a further enlarged view of a balancing section of the seal system of FIG. 1B.

Installation of the seal runner may be via a press-fit and/or a thermal interference fit (e.g., heating the seal runner and/or cooling the shaft 42) to allow the seal runner mounting section 154 to be slid onto the shaft 42 and nest the castellations 302 and splines 300. For further securement and retention, FIG. 1B shows a circumferential lock ring 350 extending through an inner diameter groove in the castellations 302 and splines 300.

Figure 3:
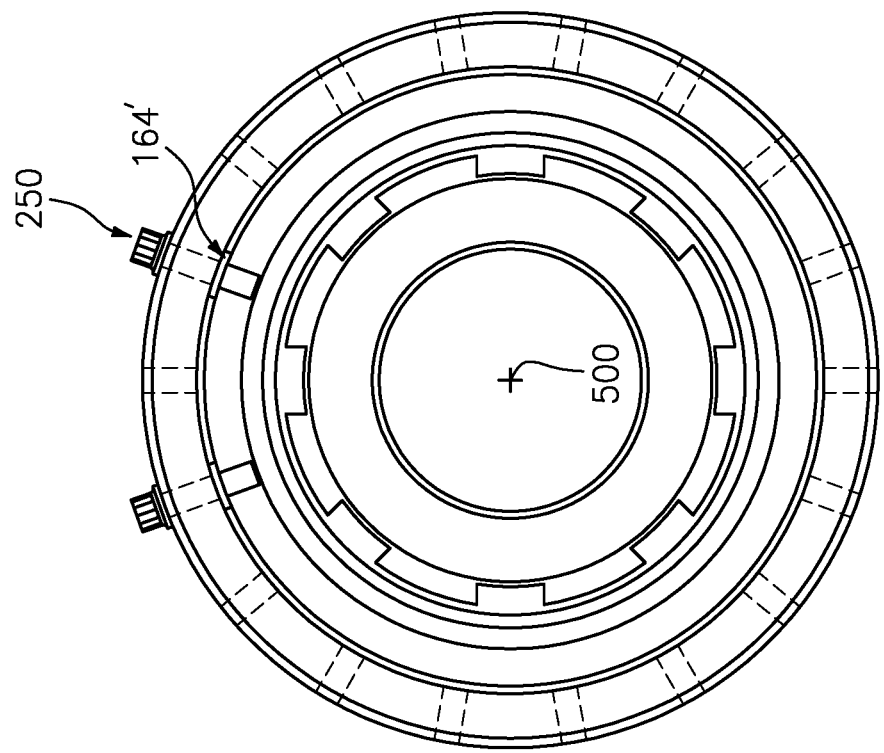
FIG. 3 is an alternate view of the seal runner and shaft bearing two weights.

As noted above, the flanges 190 and 194 add structural integrity to maintain circularity of the balancing section 153 under circumferential loads including the centrifugal load of the weight(s). As with conventional balancing, there may be multiple sizes of weights 164 (e.g., an exemplary two to four). FIG. 2 shows a single large weight 164 at a twelve o'clock position (clearly as the engine rotates the position will change). FIG. 3 shows how two different weights 164' may be circumferentially spaced. In conventional balancing, two smaller weights 164' at two adjacent holes effectively simulate a larger weight at a non-existent mounting location between such two holes.

As rotor speeds increase with new technologies (e.g., higher strength alloys capable of handling the radial pull), the requirements for engine imbalance will become more stringent to reduce engine vibrations to a minimum. Thus it may be advantageous to use the seal runner to add balancing beyond existing balance locations (planes on a given spool). Because seal runners are typically at the outermost area of each bearing compartment, they are often accessible during assembly/balancing. Depending on engine architecture, if the compressor/turbine rotor area is inaccessible, the seal runner could provide an alternate area to add trim balance weights in place of an existing area (existing on a baseline engine or, more generally on alternative engines). Furthermore, local balancing near the seal may improve seal life.

In an example of three different weight sizes, it may be easy to provide several options to counteract both the imbalance's amplitude and phase in the engine. After rotating the rotor or spool to find the as-is response, then adding a trial weight at an arbitrary location, the final magnitude and angle of the final correction can be found. For example, a target correction could be at 90-degress and 1.7 oz-in. A single available large weight 164 could be too great and a single available small weight 164' could be too small. For example, one large weight 164, mounted at 90-degrees would produce 2.8 oz-in of correction; one small weight 164' mounted at 90-degrees would produce 0.9 oz-in of correction; but two small weights 164' mounted at 80-degrees and 100-degrees would produce the desired 1.7 oz-in of correction at 90-degrees.

The axial spacing of contact locations 330 and 318 may be selected to create a long wheelbase of the mounting section 154 for the supporting the sealing section 151. Any deflection or radial offset (e.g., even due to machining tolerance and not limited to dynamic deflection) between centers of 330 and 318, causing a slope between mounting section 154 and rotor centerline 500 would translate to a similar slope in the sealing section 151. If the contact locations 330 and 318 were closer together, an identical radial offset would produce a greater slope difference between the rotor centerline 500. The sealing performance is impacted by the deviation in the axis of rotation of the seal runner to the rotor centerline. Thus, the axial offset between contact locations 330 and 318 helps address this. An exemplary length of the gap 340 is 15 to 40% of a diameter (more narrowly, 25 to 30%) of the shaft at one or both of the contact locations 330 and 318.

The forward hub 188 may be optimized to provide at least a small amount of local deflection in and around the balancing feature 160. The small axial undercut 310 radially outward of the forward end 170 creates a hinge point for any radial deflections seen in the balancing feature 160. This helps to isolate deflections in the balancing feature 160 from passing to the mounting section 154 and therefrom to the sealing area 151. Flanges 190 and 194 help maintain balancing section 153 circularity and resist outward radial flaring Cross section flexing outward about the aft end 182) exceeding the stress capabilities of the material.

To further limit deflection in the sealing area 151, the area radially outward of contact location 318 and protrusion 320 creates a second hinge point for any radial deflections seen in the forward area of mounting section 154 caused by the centrifugal force of the weights 164. Radially outward from the hinge point, hub 186 may be optimized to provide support/stiffness and helps to maintain cylindricity/circularity of sealing section 151.

This deflection isolation does not necessarily isolate the rotating member (e.g., shaft, spool) from the force generated by the balance weights 164, 164', because the seal runner is interference-fit and anti-rotation mounted on the shaft. So the centrifugal pull from the weights would still be seen at the shaft.

The hub configuration discussed above results in an axial overlap of the sealing section 151 and the mounting section 154 caused by having the slope of the aft hub 186 forming a z-shaped local cross section with the mounting section 154 and sealing section 151. Thus, in the example, both seal rings are fully within the axial span of the mounting section.

The exemplary hubs 186 and 188 are at identical angles $\theta_1$ and $\theta_2$ off axial to make machining easier. Thus only one tooling angle needs to be set when turning on a lathe. The angle on the aft side of 186 allows cooling fluid flow 400 to travel forward to cool the sealing section 151 adjacent both seal rings 120 and 122. Exemplary $\theta_1$ and $\theta_2$ are 20° to 50°, more narrowly 30° to 40°.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline engine configuration, details of such baseline may influence details of particular implementations. Accordingly, other embodiments are within the scope of the following claims.

What is claimed is:

1. A machine comprising:
an outer member;
an inner member mounted for rotation about an axis relative to the outer member; and
a seal system comprising:
  a seal housing mounted to the outer member;
  one or more seal rings held by the seal housing and having an inner diameter surface; and
  a seal runner mounted to the inner member and having a first outer diameter surface portion contacting or facing the inner diameter surface of the one or more seal rings,
wherein:
the seal runner has;
  a circumferential array of mounting features, each comprising one or more mounting holes;
  a mounting section mounted to the inner member;
  a sealing section including the first outer diameter surface portion radially outwardly spaced from the mounting section;
  a first hub between the mounting section and the sealing section;
  a balancing section including the one or more mounting holes of the mounting features of the circumferential array or mounting features; and
  a second hub between the mounting section and the balancing section;
the first hub and the second hub are angled off-radial in the same direction from the mounting section to the sealing section and the balancing section, respectively; and one or more weighs are mounted to one or more of the mounting features of the circumferential array of mounting features.

2. The machine of claim 1 wherein:
the one or more seal rings are two seal rings.

3. The machine of claim 1 wherein the sealing section axially overlaps the mounting section.

4. The machine of claim 1 wherein the mounting section has an inner diameter spline engaging a spline of the inner member.

5. The machine of claim 1 wherein the mounting section, the sealing section, the first hub, the balancing section, and the second hub are formed as a single metallic piece.

6. The machine of claim 5 wherein the single metallic piece is a Ti alloy.

7. The machine of claim 5 wherein the sealing section includes a chromium carbide coating.

8. The machine of claim 5 wherein the mounting section has an inner diameter spline engaging a spline of the inner member.

9. The machine of claim 8 wherein the spline of the inner member is a castellated rim.

10. The machine of claim 1 wherein the mounting section has an interference fit with the inner member.

11. The machine of claim 1 wherein:
each of the one or more weights is mounted via one or more fasteners extending through the one or more mounting holes.

12. The machine of claim 11 wherein:
the one or more seal rings are carbon seal rings.

13. The machine of claim 12 wherein:
the one or more seal rings are two seal rings.

14. The machine of claim 1 wherein:
the circumferential array of mounting features provides 12 to 60 discrete circumferential mounting locations.

15. The machine of claim 1 being a turbine engine wherein:
the inner member is a shaft and the outer member is a static structure.

16. The machine of claim 1 wherein:
the one or more mounting holes extend radially through the balancing section of the seal runner.

17. The machine of claim 1 wherein:
the one or more seal rings are carbon seal rings.

18. The machine of claim 1 wherein:
the balancing section extends axially to an end.

19. A method for manufacturing the machine of claim 1, the method comprising:
mounting the seal runner to the inner member; and
after the mounting of the seal runner, mounting said one or more weights to said one or more of the mounting features, the mounting of the weights comprising inserting at least one fastener through each of the weights.

20. A method for manufacturing or using the machine of claim 1, the method comprising:
rotating the inner member about the axis;
measuring vibrational parameters of the rotating inner member; and
mounting said one or more weights to improve the balance of the inner member, the mounting of the weights comprises inserting at least one fastener through each of the weights.

* * * * *